United States Patent Office 3,460,943
Patented Aug. 12, 1969

3,460,943
DIAZOTYPE MATERIALS CONTAINING MODIFIED STARCH
Walter J. Welch, Port Dickinson, N.Y., assignor to GAF Corporation, New York, N.Y., a corporation of Delaware
No Drawing. Continuation-in-part of application Ser. No. 208,116, July 6, 1962. This application May 10, 1966, Ser. No. 548,863
Int. Cl. G03c 1/52
U.S. Cl. 96—75                4 Claims

ABSTRACT OF THE DISCLOSURE

One- or two-component diazotype materials having a base coated at 100° to 150° F. with an aqueous dispersion of nonswollen modified starch particles which do not swell below 150° F., the modified starch being prepared from cornstarch—alone or mixed with tapioca, potato, or sago starch, by treatment with a minor proportion of $POCl_3$, $PCl_5$, $PSCl_3$, $SbCl_5$ or $SbOCl_3$ at pH 8–12, acidifying and filtering out the solid product—the coating composition optionally containing also a binder and a pigment such as silica, alumina, aluminum silicate and alumina-silica mixtures.

---

This application is a continuation in part of my copending application Ser. No. 208,116, filed July 6, 1962, now abandoned.

The present invention pertains to diazotype materials and, particularly, to such materials containing a component designed to assure surface smoothness and increased dye density.

It has become customary with users of the diazotype process and sensitized materials therefor to demand faster printing materials which, at the same time, yield a smooth surface with images of high density upon a clean white background. Inasmuch as the diazotype process in commercial use is a bleach-out, positive process, it is manifest that problems are encountered in meeting these demands.

To this end, the art has turned to the utilization as a precoat on the base or in one- or two-component sensitizing systems of a variety of pigments which are designed to contribute to surface smoothness and improved dye density.

Useful pigments which have been employed include various silicas, aluminas, aluminum silicate, synthetic polymeric particles and starches, such as those disclosed in U.S. Patent 2,772,974 and mixtures of finely divided silica and alumina, usually in equal parts.

Starches are useful in diazotype coatings and can be dispersed in the sensitizing solutions. However, the preparation of such dispersions must be carried out in such a way that the temperature of the coating solution does not exceed the gelatin point of the starch.

It has now been discovered that corn starch particles, modified according to the teachings of U.S. Patent 2,328,537, are particularly resistant to gelation, are inert to the diazo employed, and the use of such modified starch constitutes the purposes and objects of my invention.

It has now been estimated that this modified starch can be used in sensitizing solutions for long periods of time up to a temperature of 150° F. without any cooking or swelling of the particles occurring. Under the same conditions, unmodified starches would swell extensively and lose their value as additives to a diazotype sensitizing solution. Untreated starches cannot be used in diazotype solutions without risk at high temperatures, whereas the modified starches contemplated for use herein will work very efficiently.

The modified starches which we employ are, as stated, prepared according to U.S. Patent 2,328,537 by heating to about 100° F. an aqueous suspension of starch in an undissolved condition at a pH of about 8 to 12 with a minor proportion of a chloride such as phosphorus oxychloride, phosphorus pentachloride, thiophosphoryl chloride, antimony pentachloride and antimony oxychloride. Contact between the starch and the chloride is effected for a short time, say a few minutes, whereupon the mixture is rendered acidic and the starch product filtered off as a solid material. The product is then washed, dried, and collected by filtration. Preferably, the starch which I employ is produced by reacting a water suspension of corn starch at a pH of 11.5 with a small amount of phosphorus oxychloride at a temperature of about 100° F. This starch will be subsequently referred to as modified corn starch (sold as ARD–629 by Stein Hall).

As with other pigments, the starch can be used with or without a binder, although the use of a binder is recommended. Suitable binders include synthetic emulsions such as polyvinylacetate, cooked starches, sodium caseinate, polyvinyl alcohol, carboxy methyl cellulose, gelatin, glue and water-soluble products of the condensation of lower aldehydes, especially formaldehyde with an organic base such as dicyandiamide, urea, melamine, or the like.

The modified starch may be used as the only pigment or it may be used in conjunction with other pigments, such as finely divided silica or finely divided alumina, mixtures thereof, or aluminum silicate.

Any of the conventional light-sensitive diazonium compounds may be employed and in this connection reference is made to the diazo compounds of U.S. Patent 2,501,874, 2,807,545, 2,662,013, 2,298,444, or the like.

The diazonium compounds are used according to customary procedure in the form of stabilized salts with zinc chloride, tin chloride, cadmium chloride, or the like.

Typical examples of diazos which may be used are those derived from N,N-diethyl-p-phenylenediamine, N-benzyl-N-ethyl-p-phenylenediamine; N-ethyl-p-phenylenediamine; N-phenyl - p - phenylenediamine; N,N-diethyl-2-ethoxy-p-phenylenediamine; N-ethyl - 2 - methyl-p-phenylenediamine; N,N - bis(beta-hydroxyethyl) - p - phenylenediamine; N-beta-hydroxyethyl - n - methyl - p - phenylenediamine, and the like.

The comments with regard to the diazos apply equally to the coupling components. Thus any of the usual coupling components is satisfactory for my purpose.

Examples of suitable couplers are 2,5-xylenol; 2,3-dihydroxynaphthalene; 1,8-dihydroxynaphthalene; resorcinol, octyl-resorcinol; p-methyl-N-phenyl-pyrazolene; the amide of α-resorcylic acid; α-resorcylic acid; 2-hydroxynaphthalene, 3,6-disulfonic acid; H acid; acetyl acetanilide; 2,3-dihydroxynaphthalene-6-sulfonic acid; phloroglucinol; N-beta-hydroxy-ethyl - 2 - hydroxy-3-naphthamide, and the like.

In addition to the modified starch and light-sensitive diazo, the coating solution may contain the various adjuncts usual in the manufacture of light-sensitive diazotype materials. These include metal salts for intensification of the dyestuff image such as ammonium sulfate, nickel sulfate, zinc chloride and the like; stabilizers such as thiourea, thiosinamine, naphthalene trisulphonic acid, and the like; acids to retard precoupling such as acetic, boric tartaric and the like; hygroscopic agents such as glycol, glycerine and the like, and wetting agents such as saponin, lauryl sulphonate, the oleic acid amide of N-methyl-taurine, and the like.

The ratio of modified corn starch to binder will vary from about 1 to 20 parts of the former to 1 part of the latter. On the other hand, the quantity of binder to pigment may range from ⅙ to 1 part by weight of binder for each part by weight of pigment.

It has been indicated that the material I use is a modified corn starch. As a matter of fact, other starches may be substituted in part for the corn starch as, for example, tapioca, potato or sago starch.

It has been stated that the material on which invention is predicated involves the use of the modified starch. It appears, however, that a reaction takes place which converts the starch to a different entity, such as an acid ester of the alkali-activated starch and, in this connection, reference is made to lines 59 et seq., column 1, page 2 of U.S. Patent 2,328,537. This would explain the fact that the starch will withstand temperatures up to 150° F. before gelation sets in.

The modified starch, whether used as a precoat or in the sensitizing solution, will be uniformly coated with the sensitizer. It will, therefore, make the sensitizer more accessible to the printing light while at the same time ensuring smoothness of the surface.

The following examples will illustrate the invention but is is understood that the invention is not restricted thereto:

EXAMPLE I

Paper base material is uniformly coated with the following sensitizing composition:

| | Parts by weight |
|---|---|
| 4-dimethylaminobenzenediazonium chlorozincate | 2 |
| Zinc chloride | 5 |
| Sodium 6,7-dihydroxynaphthalene-2-sulfonate | 3 |
| N-beta-hydroxyethyl-2-hydroxy-3-naphthamide | 1 |
| Citric acid | 5 |
| Thiourea | 4 |
| Ethylene glycol | 5 |
| Modified corn starch (sold as ARD–629 by Stein Hall) | 10 |
| Silica | 2 |
| Polyvinylacetate emulsion | 5 |
| Water at 110° F. | 100 |

The paper is dried and exposed to light under a translucent original. Development is obtained by exposure to aqueous ammonia vapors. A bright, high density blue line print with excellent surface smoothness is obtained.

This formula requires temperatures exceeding 100° F. to keep all the various soluble components in solution. Under this high temperature condition, the modified corn starch showed no tendency to swell or gelatinize. At this temperature level unmodified starches would have started to gelatinize and thus ruin their effectiveness in the diazo sensitizing solution. The start particles must be unaffected by the aqueous medium in order to impart smoothness and density to the diazo print.

EXAMPLE II

Paper base material is coated uniformly with the following composition:

| | Parts by weight |
|---|---|
| 4 - (N - benzyl - N-ethylamino)benzenediazonium chlorostannate | 2 |
| Citric acid | 0.5 |
| Aluminum sulfate | 0.5 |
| 1,3,6-naphthalenetrisulfonic acid | 2.0 |
| Thiourea | 0.5 |
| Modified corn starch (sold as ARD–629 by Stein Hall) | 15 |
| Polyvinylacetate emulsion | 3 |
| Silica | 1 |
| Water at 110° F. | 1000 |

The paper is dried and exposed to light under a translucent original. Development is obtained by passing the exposed sheet through the following alkaline solution:

| | Parts by weight |
|---|---|
| Borax | 50 |
| Sodium carbonate | 20 |
| Thiourea | 10 |
| Phloroglucinol | 8 |
| Resorcinol | 6 |
| Sodium salt of isopropyl naphthalenesulfonic acid | 2 |
| Water | 1000 |

A dense black line print with excellent surface smoothness is obtained. Starches other than the modified starch used in the above sensitizing solution would have gelatized to various extents depending on the type of starch used. As a result, improvements in dye density and surface smoothness would be diminished or eliminated.

EXAMPLE III

A precoat for a diazotype sensitizing solution is prepared as follows:

| | Parts by weight |
|---|---|
| Modified corn starch (sold as ARD–629 by Stein Hall) | 12 |
| Silica | 2 |
| Sodium caseinate | 4 |
| Water at 120° F. | 100 |

This precoat composition is applied uniformly to a paper base and dried. The following sensitizing solution is applied on the precoated base:

| | Parts by weight |
|---|---|
| 4-dimethylaminobenzenediazonium chlorozincate | 2 |
| Zinc chloride | 5 |
| Sodium 3,6-dihydroxynaphthalene-2-sulfonate | 3 |
| N - beta-hydroxyethyl-2-hydroxy-3-naphthamide | 1 |
| Citric acid | 5 |
| Thiourea | 4 |
| Ethylene glycol | 5 |
| Water at 110° F. | 100 |

The paper is dried and exposed to light under a translucent original. Development is obtained by exposure to aqueous ammonia vapors. A bright high density blue line print with excellent surface smoothness was obtained. These good results would not have been obtained using starches other than modified material in the heated precoat solution.

EXAMPLE IV

A precoat for a diazotype sensitizing solution is prepared as follows:

| | Parts by weight |
|---|---|
| Modified corn starch (sold as ARD–629 by Stein Hall) | 12 |
| Silica | 2 |
| Sodium caseinate | 4 |
| Water at 120° F. | 1000 |

This precoat composition is applied uniformly to a paper base and dried. The following sensitizing solution is applied on the precoated base:

| | Parts by weight |
|---|---|
| 4 - (N - benzyl - N-ethylamino)benzenediazonium chlorostannate | 2 |
| Citric acid | 0.5 |
| Aluminum sulfate | 0.5 |
| 1,3,6-naphthalenetrisulfonic acid | 2.0 |
| Water at 110° F. | 1000 |

The paper is dried and exposed to light under a translucent original. Development is obtained by passing the exposed sheet through the following alkaline solution:

| | Parts by weight |
|---|---|
| Borax | 50 |
| Sodium carbonate | 20 |
| Thiourea | 10 |
| Phloroglucinol | 8 |
| Resorcinol | 6 |
| Sodium salt of isopropylnaphthalenesulfonic acid | 2 |
| Water | 1000 |

A bright high density black line print of excellent surface smoothness is obtained. These good results would not have been secured with starches other than the modified material in the heated precoat solution.

What is claimed is:

1. Diazotype material having a base and taken from the group consisting of (A) wherein said base has a first coating of nonswollen modified starch particles that have been applied from an aqueous dispersion at a temperature of 100° to 150° F. wherein said starch particles have not been gelatinized and a second coating overlying said first coating containing a light-sensitive diazonium, and (B) wherein said base has a coating of nonswollen modified starch particles and a light-sensitive diazonium compound, said latter coating has been applied from an aqueous dispersion at a temperature of 100° to 150° F. wherein said starch particles have not been gelatinized, said modified starch particles being prepared by reacting an aqueous dispersion of a starch selected from the class consisting of corn starch and mixtures thereof with tapioca, potato and sago starch at a pH of about 8 to 12 with a minor proportion of a chloride selected from the class consisting of phosphorous oxychloride, phosphorus pentachloride, thiophosphoryl chloride, antimony pentachloride and antimony oxychloride, acidifying the mixture and filtering out the resulting solid starch product.

2. Diazotype material as defined in claim 1 wherein the sensitizing composition contains a coupling component.

3. Diazotype material as defined in claim 1 wherein the aqueous dispersion of the modified starch contains a binder non-reactive with the diazonium compound.

4. Diazotype material as defined in claim 1 wherein the aqueous dispersion of the modified starch contains a pigment selected from the class consisting of finely divided silica, finely divided alumina, finely divided aluminum silicate and mixtures of finely divided alumina and silica.

References Cited

UNITED STATES PATENTS

| | | | |
|---|---|---|---|
| 2,328,537 | 9/1943 | Felton et al. | 99—140 XR |
| 2,474,700 | 6/1949 | Slifkin | 96—75 |
| 2,617,727 | 11/1952 | Slifkin | 96—91 XR |
| 2,772,974 | 12/1956 | Kosalek et al. | 96—91 |
| 3,155,511 | 11/1964 | Jahoda et al. | 96—75 |
| 3,159,487 | 12/1964 | Kreiger et al. | 96—75 |

NORMAN G. TORCHIN, Primary Examiner

C. L. BOWERS, Assistant Examiner

U.S. Cl. X.R.

96—91